Fig. 1

Aug. 20, 1957   W. S. EDSALL   2,803,786
CABLE PROTECTION
Filed Oct. 29, 1952   5 Sheets-Sheet 2

INVENTOR.
William S. Edsall
BY

United States Patent Office 2,803,786
Patented Aug. 20, 1957

2,803,786

CABLE PROTECTION

William S. Edsall, Boston, Mass., assignor to The Chase-Shawmut Company, Newburyport, Mass.

Application October 29, 1952, Serial No. 317,518

16 Claims. (Cl. 317—36)

This invention relates to the protection against overloading of electrical conductors which are insulated by an organic insulating material.

A related invention has been disclosed in the co-pending patent application W. S. Edsall et al.; Ser. No. 222,658; filed April 24, 1951, now Patent No. 2,645,690, for Thermal Protector for Conductor Insulation.

Heating of the metallic current carrying core of a cable by overload currents and by short-circuit currents may reach, and go beyond, the point of impairment of the organic insulating material of which the covering enveloping the core of the cable is made. Such impairment may consist either in immediate deterioration of the dielectric properties of the organic insulating covering of the cable, or in a reduction of the useful life thereof.

It is one object of this invention to provide an improved system of thermal cable protection against the dangers inherent in, and resulting from, overloads of excessive duration.

Heretofore cables were generally protected either by fuses, or by automatic circuit breakers with built-in tripping relays. The interrupting characteristics of such relays are supposed to closely match the safe operating temperature characteristic of the protected cable. This object could not be achieved satisfactorily either with any prior art fuse used for cable protection or with any prior art circuit breaker applied for this purpose.

The thermal overload relays which are currently widely used for the protection of cables are either of the direct expansion type, the solder type, or the bimetallic type. The current which flows through the cable to be protected, or a current which is proportional to this current, generates heat in the overload relay which raises the temperature of the thermal tripping element thereof and causes tripping of the circuit breaker into which it is built, or with which it is associated, when the thermal tripping element has reached a predetermined temperature. It was widely believed heretofore that it is possible by proper design of the parts of the relay, and providing the necessary heat-storing capacity, to closely match the safe operating temperature characteristic of the cable by the tripping characteristic of the relay. In fact, a wide margin is left in any device of this nature between the tripping characteristic of the relay and the safe operating temperature characteristic of the cable. In other words, the cable is overprotected, resulting in many nuisance trips and unwarranted discontinuity of service.

It is, therefore, another object of this invention to provide a vide a protective system permitting to fully utilize the current-carrying ability of a cable relatively close to the margin at which it still can safely be operated, thus greatly tending the preserve continuity of service, the system causing interruption of an overloaded cable circuit only when and if failure to interrupt would permanently impair the insulation of the cable, or impair the service for any other reason. Such an impairment of the service for another reason might be smoke evolution from the cable without immediately noticeable reduction of the dielectric strength of the insulation thereof.

One of the reasons for the failure of prior art protective means—fuses as well as thermal circuit breakers and thermally responsive automatic switches—to achieve a close match of the interrupting characteristic and the safe operating temperature characteristic of the cable is due to the fact that the latter was rather undetermined, or had been determined more or less arbitrarily. It appears that the life of the insulation of any cable depends largely on its average operating temperature and that the former increases as the latter decreases. It is, therefore, possible to greatly increase the life of a cable by limiting its average load. In other instances a relatively high load average with concomitant reduction of the life of the cable may be indicated. Thus the life of the insulation of a cable is generally no unequivocal criterion for establishing a safe operating temperature characteristic to be matched by the interrupting characteristic of any fuse, thermal circuit breaker, or automatic switch.

The degree of immediate damage to the insulation of a cable by the effects of heat over given periods of time—as distinguished from a long range impairment of its life which is not immediately perceptible—can be determined by standardized methods for measuring the dielectric breakdown and also by cold bend tests. A safe operating temperature characteristic based on immediate damage to the insulation of a cable is a type of curve with which—though not too well defined—one may possibly try to match the interrupting characteristics of protective devices. However, as a general rule, evolution of smoke from the insulation of an overloaded cable may be observed before immediate damage occurs to the insulation thereof. Since smoking of cables cannot be tolerated in most applications as, for instance, power plants, industrial and residential buildings, air planes, submarines, etc. it became necessary to establish safe operating temperature characteristics of cables by load tests carried to the point at which smoke first appears.

It is, therefore, another object of this invention to provide a protective system for cables which permits a close match of the interrupting characteristics of interrupting devices with the safe operating temperature characteristics of cables as determined by smoke evolution tests.

The safe operating temperature characteristic of a cable seen as the smoking point characteristic thereof is a function of time and of temperature. If the temperature of the current carrying core of the cable is relatively high, smoke evolution starts relatively soon, but if the temperature of the current carrying core of the cable is relatively low, a relatively long period of time elapses before any evolution of smoke from a cable can be observed. In other words, cables have an inverse time-temperature smoking point characteristic.

It is, therefore, another object of the invention to provide a thermally responsive protective system including time lag means which enable a close match between the response characteristics of interrupting devices and the inverse time-temperature characteristics of cables, thus permitting to maintain continuity of service after any given temperature has been reached by the core of the cable for a period of time depending upon the magnitude of that temperature, rather than interrupting the flow of current through a cable at a fixed temperature deemed to be critical.

Another object of the invention is to provide a system of thermal cable protection having an inherent compensation of ambient temperatures with regard to each cable protected by the system.

Another object of the invention is to provide a composite system of circuit protection wherein protection against overloads is achieved by a circuit interrupter of relatively limited interrupting capacity having a pair of separable contacts and a tripping characteristic closely matching the smoking point characteristic of the cable with which it is associated, and wherein protection against short-circuit currents in both the cable and the circuit interrupter is achieved by a current-limiting fuse having an interrupting capacity greatly exceeding the interrupting capacity of the circuit interrupter.

Still another object of this invention is to provide a signalling system for indicating at a point remote from the point of a cable where its temperature is being measured by a temperature sensing element that the time for safely operating the cable at that temperature is about to expire and smoking or permanent deterioration of the cable imminent.

Another object of the invention is to provide a protective system for cables exposed to widely varying ambient temperatures at different points of their length, which system includes means for sensing or measuring the temperature of the core of the cable at a plurality of different points of the length thereof, and means for translating any such indication or measurement into a signalling or tripping impulse if and when the product of time and temperature prevailing at any given point of said plurality of points comes close to the smoking point of the insulation of the cable.

It is common practice to enclose large numbers of thermal circuit breakers for the protection of the various cable lines of a cable system in a common enclosure. Each of these circuit breakers is provided with a thermal relay, or equivalent thermal tripping means, including a heat generating resistance or heater for simulating the $I^2 \cdot r$ losses in each cable line. The total amount of heat generated by all the heat generating resistances or heaters of all thermal circuit breakers which are accommodated in a common enclosure determines the temperature which prevails therein. This temperature is an artificial ambient to which the thermal relays, or equivalent thermal tripping means, of each circuit breaker accommodated in the common enclosure are subjected. This artificial ambient is often very different from the actual ambients to which each of the various cable lines is subjected. The larger the discrepancy between said artificial ambient and said actual ambients, the farther apart the tripping characteristics of the circuit breakers within the common enclosure from whatever may be deemed the safe operating temperature characteristic of each individual cable.

It is, therefore, another object of the invention to provide a protective system for a plurality of cable lines including a plurality of circuit interrupters capable of being housed in a common enclosure without being subject to tripping errors resulting from the mutual thermal effect upon each other of a plurality of thermal tripping devices each associated with a different circuit interrupter and a different cable line.

Further objects and advantages of this invention will become apparent as the following description proceeds and the features of novelty which characterize this invention will be pointed out with particularity in the claims annexed to and forming part of this specification.

For a better understanding of this invention reference may be had to the accompanying drawings in which.

Figure 1:
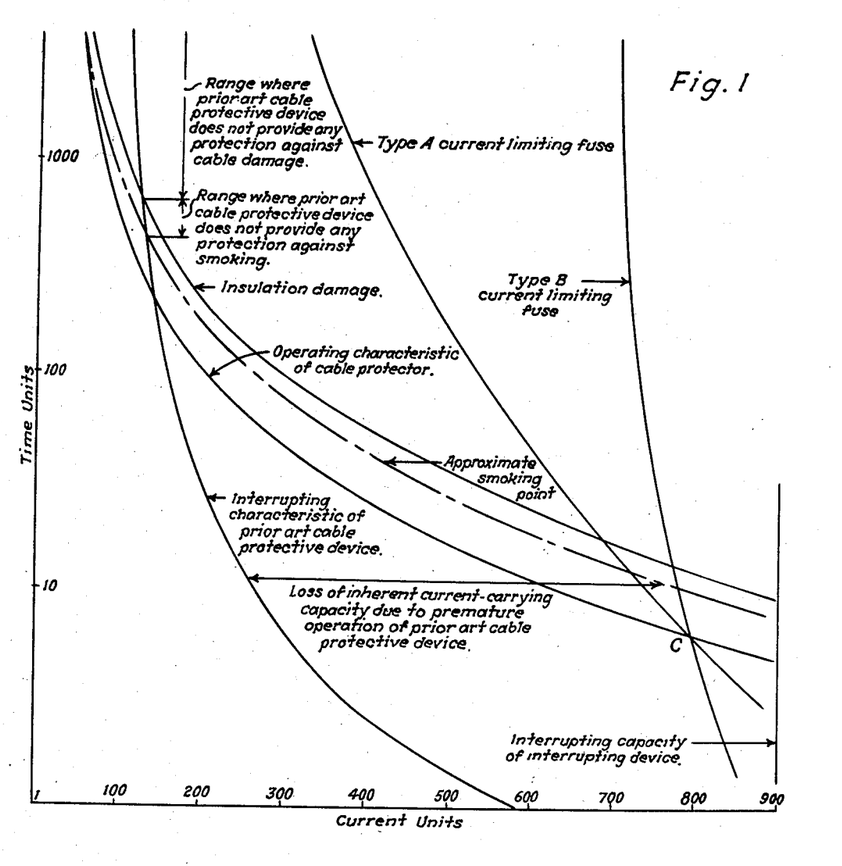
Fig. 1 shows a number of time current characteristics illustrating the invention.

Referring now to Fig. 1, wherein both the abscissae and the ordinates are plotted logarithmically, the time-current characteristic marked insulation damage refers to a given cable and is generally indicative of the load currents which can safely be carried by that cable for given periods of time without any noticeable damage to the insulation thereof. The curve marked approximate smoking point is generally indicative of the load currents which can be carried by the cable for given periods of time without evolution of smoke from the insulating covering of the cable. Evolution of smoke occurs for any given current before noticeable damage is being done to the insulating covering of the cable.

The curve marked interrupting characteristic of prior art cable protective device refers to a prior art device which has been used heretofore for the protection of the cable. There is a range where the prior art cable protective device does not provide any protection against cable damage and this range has been marked accordingly. There is another range where the prior art protective device does not provide any protection against smoking of the cable and this range has been marked accordingly. In still another range there is a loss of inherent current-carrying capacity of the cable due to premature operation of the prior art cable protective device and this range has been marked accordingly in Fig. 1. In the last referred-to-range the cable is overprotected to the detriment of service continuity.

An ideal operating characteristic of a protective device for the cable in hand would lie close below the smoking point characteristic of the cable and approximately match the latter throughout the load and overload current range of the cable. The curve shown in Fig. 1 marked operating characteristic of cable protector refers to a thermal relay embodying the present invention and shows how close to the ideal the match is between the operating characteristic of that relay and the smoking point characteristic of the cable.

The thermal relay whose characteristic is shown in Fig. 1 might be used to trip a circuit interrupter of the type having a pair of relatively movable or separable contacts. If both this circuit interrupter and the cable itself are protected against short-circuit current by a current-limiting fuse, a circuit interrupter of but limited interrupting capacity is required for the protection against fault currents of relatively small magnitude but excessive duration.

Fig. 1 indicates the characteristic of two kinds of current-limiting fuses suitable for such a coordination between a circuit interrupter of the type having relatively movable contacts and a current-limiting fuse. One of the two characteristics has been marked type A current-limiting fuse and the other characteristic has been marked type B current-limiting fuse. Type A fuses have relatively lower current carrying capacity. The increased current carrying capacity of type B fuses may be achieved by more effective cooling of the link structure of the fuse as is well known in the art. The cross-over point of the operating characteristic of the thermal relay and of the fuse characteristics has been marked by a capital C. Any fault current less than the abscissa of the cross-over point C of the operating characteristic of the thermal relay and the characteristics of the current-limiting fuses is being interrupted by the circuit interrupter of the type having separable contacts. Any fault current in excess of this critical current is cleared by the operation of the current-limiting fuse.

Because of this coordination of thermal relay and current-limiting fuse the interrupting capacity of the circuit interrupter under the control of the thermal relay requires but a small safety margin above the abscissa of the cross-over point C of the relay characteristic and the fuse characteristics. The interrupting capacity of the interrupting device of the type having a pair of relatively movable contacts—either a circuit breaker having a relatively small interrupting capacity or an automatic switch—under the control of the thermal relay has been indicated in Fig. 1 of the drawing by the words interrupting device.

It will be apparent from Fig. 1 that the combined action of the thermal relay and of the circuit interrupter of the type having a pair of relatively movable contacts provides perfect protection of the cable against fault currents of relatively small magnitude but excessive duration whereas protection of the cable against fault currents of short-circuit current proportions is provided by the coordination of the thermal relay and the current-limiting fuse. The way in which this coordination is achieved permits to apply a small interrupting capacity and hence inexpensive device for all switching operations below the cross-over point C.

Figure 2:
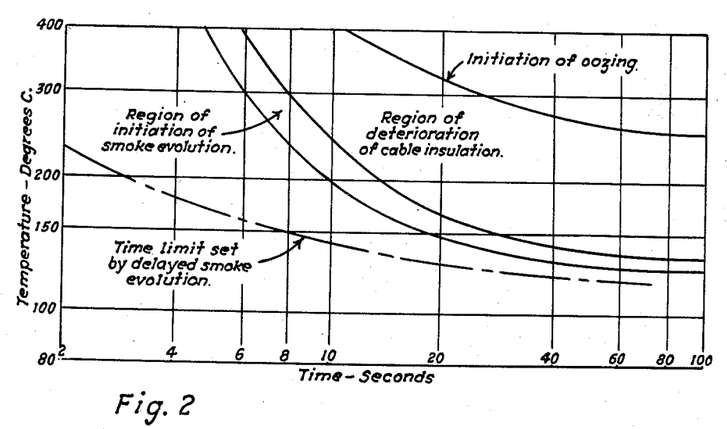
Fig. 2 shows a typical smoking point characteristic and related characteristics of a cable.

Referring now to Fig. 2, the abscissae and the ordinates thereof are both drawn logarithmically, the former indicating time in seconds and the latter temperatures in degrees centigrade. There is a narrow zone indicative of the times at which initiation of smoke evolution from the cable was observed for different current values. The region above the zone of initiation of smoke evolution may be considered as region of deterioration of cable insulation and has been marked accordingly. The time at which oozing started is indicated by a curve marked initiation of oozing.

In cables of relatively large size smoking may occur only after the cable has been disconnected from the source of current. While relatively small wires rapidly give up the heat generated therein by $I^2 \cdot r$ losses to their insulating covering, cables of relatively large size—on account of the greater ratio of their heat absorbing capacity to the heat absorbing capacity of their insulating covering—may cause a delayed evolution of smoke which takes place only after the cables have been disconnected from their source of current. The curve in Fig. 2 marked time limit set by delayed smoke evolution ought to be considered as the safe operating temperature characteristic of the cable wherever the cable is of a nature which may cause delayed evolution of smoke from the insulating covering upon deenergization of the circuit.

It will be observed from Fig. 2 that the right side of the smoke initiation curve and of the delayed smoke curve are almost parallel to the axis of abscissae. Thus the curves determine the temperature which, if maintained permanently or continuously, would cause smoking and/or damage to the insulating material of which the covering of the cable is made. The maximum continuous current of a specified cable is the highest current which can be carried by it continuously without evidence of smoke or deterioration of its insulating covering, and if a cable is carrying its maximum continuous current for some time its temperature tends to approach but does not reach the above referred to critical temperature.

The ultimate trip of a circuit interrupter is defined to be the minimum current which causes tripping of the interrupter under a set of predetermined conditions. The minimum trip should slightly exceed the maximum continuous current of a cable, and the higher the overcurrent in the cable above the maximum continuous current, the sooner tripping of the circuit interrupter ought to take place. In other words, the response characteristic of a thermal relay and the tripping characteristic of a thermal circuit interrupter under the control of the relay ought to match closely the smoking point characteristics of the cable which they are called to protect rather than to effect interruption of a cable circuit at any fixed temperature of the cable.

The protective system according to this invention includes a cable, i. e. a conductor having a metallic core and an organic covering enclosing said core. The covering is removed from the conductor along a relatively short length thereof, e. g. a length in the order of one inch. A thermal relay having its heat responsive element arranged in spaced relation from said conductor is associated with said conductor to control the temperature thereof. This relay is set to respond to a fixed temperature slightly in excess of the temperature assumed by said core of said conductor when said conductor is continuously carrying the maximum continuous current thereof. A heat conducting and heat absorbing structure is arranged at the point of said conductor where said covering is removed. This structure is in close heat exchanging relation to both said core and said heat responsive element of said thermal relay and has thermal parameters balanced to assimilate the response characteristic of said thermal relay to the smoking point characteristic of said covering. The arrangement is made in such a way that the core of the cable is virtually the only source of heat to the thermal effect of which said thermal relay and said structure are subjected, i. e. while said thermal relay and said structure are subjected to the thermal effects of ambients in the same way as the conductor is, any extrinsic source of heat as, for instance, that of any heater, fuse, or the like, is precluded from thermally affecting said thermal relay and said structure.

While the aforementioned thermal relay is operative in response to a fixed temperature, that fixed temperature is reached by the heat responsive element of the relay within different periods of time, depending upon the difference in temperature between the core of the cable and the heat responsive element. If this difference in temperature is relatively small, a relatively long time will elapse until the heat responsive element of the relay reaches the fixed temperature at which the relay is set to become operative. However, if this difference in temperature is relatively large, a relatively long time will elapse until the heat responsive element of the relay will reach the fixed temperature at which the relay is set to become operative. Thus the heat exchange structure arranged between the core of the cable and the thermal relay converts the operating characteristic of the relay into an inverse time-temperature characteristic of the type required to assimilate the operating characteristic of the thermal relay to the smoking point characteristic of the cable.

Considering a thin slab of a heat conducting material as, for instance, aluminum or copper, having a thickness of $d$ centimeters, an area of face of $A$ square centimeters, the temperature of the rear face being $\theta_1$ centigrades and that of the front face $\theta_2$ centigrades, with $\theta_2 > \theta_1$ and assuming $\theta_1$ and $\theta_2$ to be maintained constant, then the total heat Q transported is given by $$Q = \frac{kA(\theta_2 - \theta_1)}{d} \text{ (cal.)} \qquad (1)$$

or $$k = \frac{Q}{t\frac{\theta_2 - \theta_1}{d} \cdot A} \quad \text{(cal./cm. sec. deg. C.)} \quad (2)$$

where $k$ is the coefficient of thermal conductivity, $Q$ the number of calories transferred, $t$ the time in seconds, and $$\frac{\theta_2 - \theta_1}{d}$$

the temperature gradient. The coefficient of thermal conductivity expressed in terms of cal./cm. sec. deg. C. is .480 for aluminum and .918 for copper. The thermal parameters of the slab under consideration are the coefficient of thermal conductivity $k$ which depends on the nature of the material of which the slab is made, its surface area $A$, and its thickness $d$.

The term thermal parameters, as used with reference to the heat exchange structure for transferring heat from the core of the cable to the heat responsive element of the thermal relay includes, in addition to the above quantities, a factor which depends upon the geometrical configuration of the structure and upon convection from the structure to the circumambient medium.

Equations 1 and 2 do not apply to the heating of the heat exchange structure and the thermal relay by the core of the cable since the latter heating process is not one wherein the temperature gradient is maintained constant. Reference to these two equations was made for a simple explanation of the term thermal parameter.

The heating curve of a cable for any given current is defined by the equation $$\theta = \theta_0 + (\theta_m - \theta_0)(1 - e^{-t/K}) \quad (3)$$

where $\theta$ = conductor temperature at any time $t$
$\theta_0$ = initial conductor temperature at a time $t = 0$
$\theta_m$ = max. temperature conductor will reach if current is held constant until thermal equilibrium is reached
$K$ = constant of cable which depends upon the cable construction and the installation conditions.

The following table gives approximate values for $K$ in hours.

|  | Cable in Air | Cable in Ducts Underground | Cable Buried in the Ground |
|---|---|---|---|
| Small Sizes | 1/3 | 1 | 1 1/4 |
| Intermediate Sizes | 1 | 2 1/2 | 3 |
| Large Sizes | 1 1/2 | 4 | 6 |

It appears from Equation 3 that the heating of a cable is governed by an exponential equation. Under thermal equilibrium conditions the temperature of the heat responsive element of the thermal relay is equal to the temperature of the core of the cable as defined by Equation 3. Upon any rise of the temperature of the cable the temperature of the heat responsive element of the thermal relay rises equally but with a time lag which depends (a) upon the temperature of the cable or the temperature gradient between cable and heat responsive element, respectively, and (b) upon the thermal parameters of the heat exchange structure and the thermal parameters of the thermal relay. The rise in temperature of the heat responsive element of the thermal relay may be described mathematically by an exponential function lagging the exponential function which describes the rise in temperature of the core of the cable. It is this time lag and the possibility of its control by modifying the thermal parameters of the heat exchange structure and the thermal parameters of the thermal relay which permits to closely assimilate the operating characteristic of the thermal relay to the smoking point characteristic of the covering of the cable.

The proper balance of the thermal parameters of both the heat exchange structure and of the thermal relay to achieve a close assimilation of the characteristics of the relay to the smoking point characteristic of the cable must empirically be found for each different type of cable with due regard to the installation conditions thereof. I have found that the required assimilation of the characteristic of the relay to the smoking point characteristic of a copper power cable calls generally for a local increase of heat absorbing capacity in the order of 2 1/2 times, or more, of the heat absorbing capacity of an equal length of cable. This local increase of heat absorbing capacity can readily be achieved by using as heat exchange structure a substantially cylindrical tubular block of copper which is in physical contact with both the core of the cable and the thermal relay and which has a mass in the order of 1 1/2 times, or more, of the mass of an equal length of cable.

Among the prior art overload protective systems of which I am aware one generally referred to as inherent motor protection is in some respect similar to this invention though, upon a more close consideration, the concepts on which this invention is based and the means for carrying these concepts into effect are basically different from the concepts and means on which inherent motor protection is predicated.

As mentioned before, this invention is predicated on the smoking point characteristic of the covering of a cable whereas any kind of motor protection is generally predicated upon the life of the insulation of a motor. The insulation in a class A insulated motor deteriorates slowly, even at normal operating temperatures. As the temperature is increased insulation deterioration is greatly accelerated. The so called "8-deg. rule" frequently relied upon is to the effect that the life of class A insulation is approximately halved for 8 deg. centigrade increase in continuous operating temperature above 104 deg. centigrade. Motor protective devices are generally predicated upon preventing the motor to exceed a substantially fixed temperature deemed to result in premature insulation breakdown, or excessively rapid insulation deterioration, rather than on any empirically determined time-temperature characteristic in the nature of the smoking point characteristic of a cable.

The fundamental idea of inherent motor protection is to limit the stator windings of a motor below a fixed maximum temperature deemed to be critical, regardless of how this temperature might be reached. To carry this principle into effect would call for a thermal relay the temperature sensing element of which is arranged inside the stator winding of the motor to closely follow any change in temperature of that winding. It was found practically impossible to build such a thermal relay. When the thermal relay was arranged outside the stator winding in spaced relation thereto, the relay did not closely follow all variations of the stator winding temperature as it should, according to the thinking underlying inherent motor protection. It proved therefore necessary to provide the thermal relay with an auxiliary heater, or its equivalent, to cause the temperature sensing element of the relay to closely follow the copper temperature of the windings. Thus not withstanding a vague similarity between this invention and inherent motor protection, the basic lines of thinking upon which either of both are based have little in common.

Figure 3:
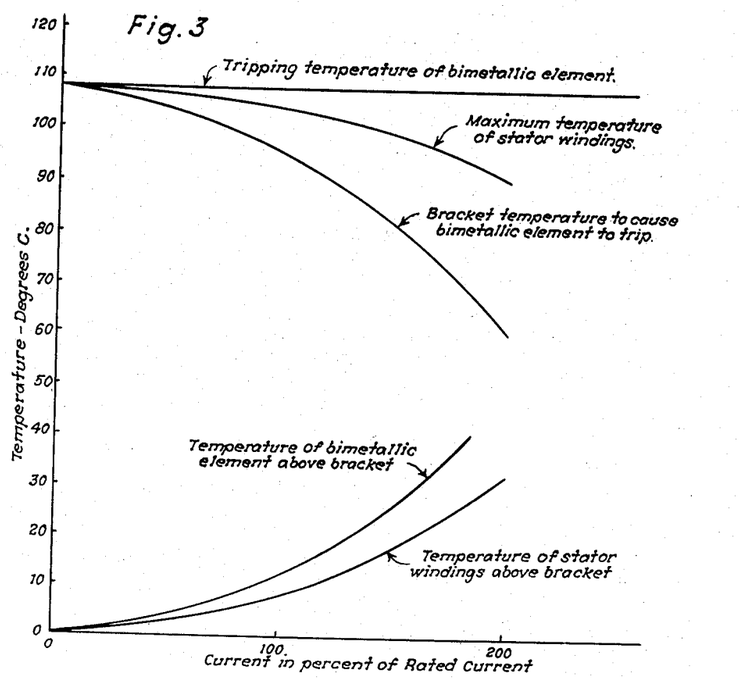
Fig. 3 shows the temperatures in an electric motor having inherent overheating protection to distinguish this type of protection from the protective system according to this invention.

To better distinguish the invention from inherent motor protection Fig. 3 illustrates the temperatures in an electric motor protected by an inherent overheating device.

If no auxiliary heater were present in the structure, the temperature of the heat sensing element of the thermal relay would be the same as that of the iron parts of the motor, except for a small lag of, perhaps, in the order of 1 to 2 deg. centigrade. The temperature of the iron parts depends upon ambient temperature, efficiency or failure of ventilation, rotor copper loss and core loss. The auxiliary heater connected in series with the line generates heat proportional to the square of the stator current and hence proportional to the stator copper loss. As a result, the temperature sensing element of the thermal relay will get hotter than the bracket of the motor by an amount proportional to the temperature rise of the stator windings above the temperature of the bracket.

In Fig. 3 the temperature of the stator windings above bracket and the temperature of a bimetallic temperature sensing element of a thermal relay have been plotted as proportional to the square of the stator current. The fixed tripping temperature of the thermal relay has been indicated by a line parallel to the axis of abscissa. The curve bracket temperature to cause bimetallic element to trip is obtained by subtracting the temperature of the bimetallic element above bracket from the tripping temperature of the bimetallic element. Adding the temperature rise of the stator windings above bracket to the bracket temperature to cause bimetallic element to trip yields the maximum temperature of stator windings vs. current characteristic of the protective device. Under no-load conditions tripping will occur at somewhat less than 110 deg. centigrade whereas on 200 percent of full load tripping will occur at slightly less than 100 deg. centigrade. Thus the thermal relay having a bimetallic heat sensitive element which is subjected to the effect of an auxiliary heater limits the temperature of the stator windings to a very small range, nearly a constant value, for the full range from no-load to 200 percent load. This is evidently a kind of protection very different from the cable protection effected by the present invention, one of the main objects of which is to admit a wide range of maximum cable temperatures, depending upon the duration of the overload.

Figure 4:
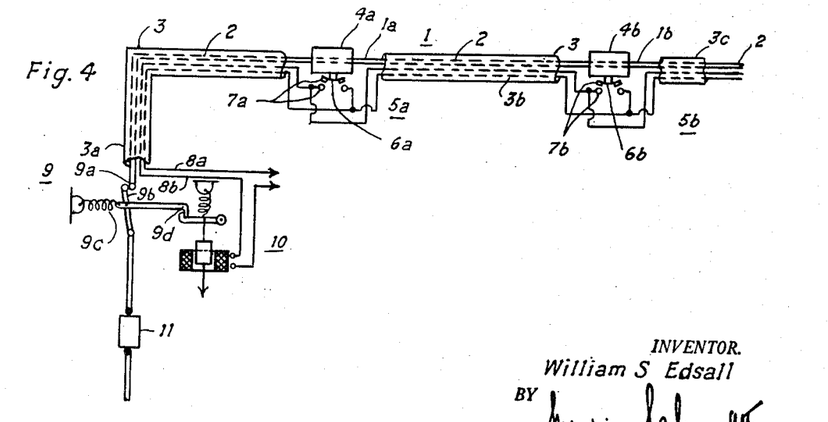
Fig. 4 is a wiring diagram of a protective system according to this invention applied to a single phase circuit.

Referring now to Fig. 4, reference numeral 1 has been applied to a cable having a current carrying core 2 and an organic insulating covering 3 of a rubber compound or another insulating material enveloping the core 2. Cable 1 is provided with a plurality of bare sections 1a, 1b of relatively short length where the insulating covering 3 is removed from the cable to expose the core thereof. The length of the sections 3a, 3b and 3c of the covering 3 where the latter is not removed from the cable by far exceeds the length of the bare sections 1a, 1b. The insulation may be removed at the bare sections 1a, 1b either along the entire periphery of the cable to produce a toroidal space between immediately adjacent sections of the covering 3, or the insulation may be removed only along a portion of the periphery of the cable to form a recess or cavity in the covering thereof. The depth of the above toroidal space, or the depth of the above recess or cavity is equal to the thickness of the covering to completely expose a surface of predetermined area of the core 2 of the cable 1. Core 2 is provided at each bare section 1a, 1b thereof with a thermally conductive structure 4a, 4b in close heat exchanging relation to, preferably in physical contact with, the respective bare section of core 2. A thermal relay or thermally responsive auxiliary switching device 5a, 5b is arranged in close heat exchanging relation to, preferably in physical contact with, each of the thermally conductive structures 4a, 4b. The switching devices 5a, 5b each include a bimetallic element 6a, 6b and at least one pair of contacts 7a, 7b relatively movable under the action of said bimetallic element. The auxiliary switching devices 5a, 5b may be disc-type thermostats wherein the moving bimetallic element 6a, 6b is a bimetallic disc, generally designated as Spencer disc. The bimetallic discs 6a, 6b are dish-shaped, with the high-expansive side of the bimetal on the concave side of the disc at normal temperature and with the non-expansive metal in physical contact with the heat exchange structures 4a, 4b. As the discs 6a, 6b are heated by the heat generated in the core 2 of the cable 1 and conducted to the discs 6a, 6b through the heat exchange structures 4a, 4b, the high-expansive layers of the discs try to expand but are initially restrained from so doing by the non-expansive layers of the discs. As the temperature of discs 6a, 6b is progressively increased, stresses are set up therein tending to buckle the discs. When either of discs 6a, 6b has reached a critical temperature, the respective disc snaps suddenly from the convex to the concave position thereof, thereby closing the contacts 7a or 7b, respectively. The discs 6a, 6b of the switching devices 5a, 5b operate in response to a fixed temperature slightly less than the minimum temperature which, if permanently maintained, would cause evolution of smoke from the insulating material of which the covering 3 is made.

The fact that the bimetallic discs 6a, 6b each engage a surface of the heat-exchange blocks 4a, 4b which is spaced from the surface thereof which is in physical contact with the core 2 of cable 1 causes the temperature of the bimetallic discs to lag behind the temperature of core 2 upon any increase of the current carried by conductor 1. Core 2 is virtually the only source of heat to the action of which the switching devices 5a, 5b are exposed when the conductor 1 is carrying current, any auxiliary heater for the bimetallic discs 6a, 6b being omitted and any appreciable thermal effects of any extrinsic source of heat upon the bimetallic discs 6a, 6b being eliminated either by the absence of such a source or sources, or by appropriate thermal insulation, if such a source or such sources should be present. The thermal parameters of heat exchange structures 4a, 4b and the thermal parameters of the switching devices 5a, 5b are determined to closely match the operating characteristics of the switching devices 5a, 5b and the smoking point characteristic of cable 1 throughout substantially the entire overload range of the cable.

Shortly before the smoking point is reached at either point of the cable where one of the switching devices 5a, 5b is located, the respective switching device snaps closed, thereby energizing a signalling circuit in which both switching devices 5a, 5b are arranged in parallel. The signalling circuit includes two control or pilot wires 8a, 8b which form an integral part of cable 1. Control or pilot wires 8a, 8b may either energize a warning signal arranged at a convenient point remote from the switching devices 5a, 5b, or may energize a tripping coil for tripping a circuit interrupter. Fig. 4 shows the latter type of arrangement. A circuit interrupter 9 of the type comprising a pair of separable contacts 9a, 9b is arranged at a convenient point remote from the switching devices 5a, 5b. Spring 9c biases the circuit interrupter 9 to contact open position, but normally contacts 9a, 9b are restrained in closed position by the action of a latching mechanism 9d. Magnetic tripping relay 10 is energized upon closing of either switching device 5a or 5b and causes opening of the circuit interrupter 9 by acting upon its latching mechanism 9d.

The current-limiting fuse 11 is provided for the protection against short-circuit currents of both the circuit interrupter 9 and the cable 1. The interrupting capacity of the circuit interrupter may be much less than the available short-circuit current in the cable line 1, provided that the interrupting capacity of the current-limiting fuse 11 is sufficiently high to clear any short-circuit current which may occur in cable line 1. Fig. 1 shows two different interrupting characteristics which fuse 11 may have. Reference sign C has been applied to the cross-over point of the fuse characteristics and the operating characteristics of the switching devices 5a, 5b. The ordinate in Fig. 1 marked interrupting capacity of interrupting device indicates the interrupting capacity of the circuit interrupter 9 shown in Fig. 4. It is apparent that the interrupting capacity of circuit interrupter 9 exceeds but slightly the current which corresponds to the cross-over point C of the operating characteristics of switching devices 5a, 5b and the interrupting characteristic of the current-limiting fuse 11.

It is apparent that there is a strict segregation in the protective system shown in Fig. 4 of overload protection and short-circuit current protection. Fuse 11 is designed as a current-limiter only to keep the let-through current well below the peak of the available short-circuit current. Fuse 11 does not provide any protection against overloads. Such a fuse can be made to perform its single function more effectively than any fuse designed for both short-circuit protection and overload protection.

Current-limiting fuse 11 is arranged serially with respect to conductor 1 and may be located at any convenient point of the system. As a rule one of the bare sections of core 2, one of the heat exchanging structures 4a, 4b and one of the switching devices 5a, 5b are accommodated in a common housing or enclosure of insulating material. Fuse 11, or the casing thereof, must be spaced sufficiently apart from parts 4a, 5a and 4b, 5b, respectively, and from their insulating housings to preclude any substantial thermal effects upon any of the switching devices 5a, 5b by the heat generated in fuse 11. Without taking such precautions the operating characteristics of devices 5a, 5b cannot closely be assimilated to the smoking point characteristic of the cable.

If desired an acoustical or optical signalling device may be substituted for the tripping device 10 and if such substitution is made a manually operated power switch of the load disconnect type ought to be substituted for the automatic circuit interrupter 9.

Figure 5:
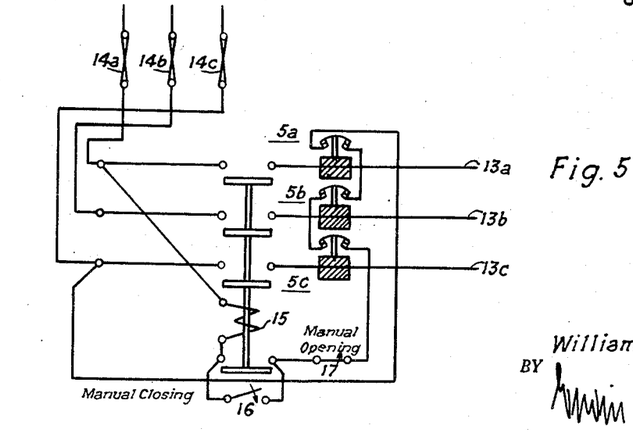
Fig. 5 is a wiring diagram of a protective system according to this invention applied to a polyphase circuit.

Fig. 5 refers to thermal protection of the cables of a multiphase circuit and comprises an arrangement for cutting off the power supply upon overloading of the conductor of one of the three phases of the circuit. Reference numeral 12 indicates generally a circuit interrupter of the contactor type used for controlling a multiphase circuit including the three cables 13a, 13b, 13c. Each cable is provided with a thermal relay or auxiliary switching device 5a, 5b, 5c of a similar kind as the switching devices 5a, 5b shown in Fig. 4 and described in its context except that the devices 5a, 5b, 5c open rather than close the control circuit when the safe operating temperature of a cable is exceeded. The three switching devices 5a, 5b, 5c are arranged in series in the circuit of the holding coil 15 of interrupting device 12, resulting in deenergization of the holding coil 15 and opening of the circuit interrupter 12 upon opening of any of the three auxiliary switching devices 5a, 5b, 5c.

The current-limiting fuses 14a, 14b, 14c are provided for the protection of both the circuit interrupter 12 and the cable lines 13a, 13b, 13c against short-circuit currents.

Reclosing may be effected upon interruption of the polyphase circuit on account of an overload by closing the manually operable switch 16 and thus re-energizing holding coil 15. This, however, can only be achieved if the cable lines 13a, 13b, 13c have sufficiently cooled down to cause automatic reclosing of the three thermal relays or auxiliary switches 15a, 15b, 15c. The manual switch 17 is arranged in series with holding coil 15 and switching devices 15a, 15b, 15c and serves the purpose of enabling manual interruption of the power circuit.

Figures 6, 7:
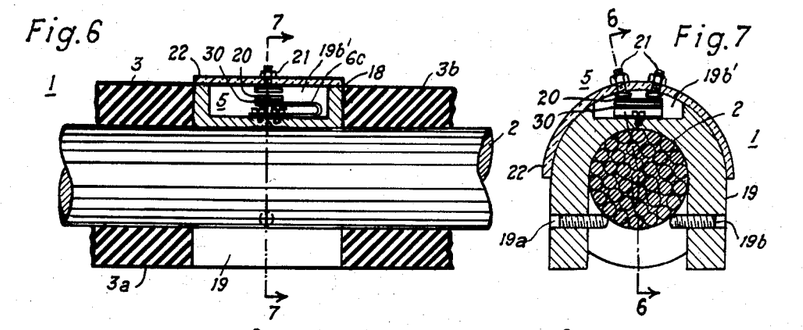
Fig. 6 is substantially a longitudinal section of a structure embodying the present invention.
Fig. 7 is a section along 7—7 of Fig. 6.

Referring now to Figs. 6 and 7, reference numeral 2 has been applied to the core of a cable 1 and reference numeral 3 to the insulating covering thereof. Covering 3 is removed from conductor 1 along a short portion of its length, thus establishing a short toroidal gap 18 between sections 3a, 3b of covering 3 spaced by gap 18. The clamp 19 is supported by and clamped on conductor 1. Clamp structure 19 may consist entirely of metal. If not all-metallic it should include a metallic portion in close heat exchanging relation to, preferably in physical contact with, the core 2 of cable 1 at the point thereof where the insulating covering is removed to produce toroidal gap 18. In the embodiment shown in Figs. 6 and 7 the clamp structure 19 is in the shape of a horse-shoe and provided with a pair of set screws 19a, 19b to firmly hold it to the core 2 of the cable 1. The upper part of the clamp structure 19 defines a cavity 19b adapted to form a chamber for accommodating a thermal relay 5. The thermal relay or switching device 5 comprises a U-shaped bimetallic strip 6c of which one shank is screwed to the clamp structure 19 to establish a good heat conducting relation between clamp structure 19 and bimetallic strip 6c. The other shank of bimetallic strip 6c supports a contact bridge 20 by means of an insulating strip 30 to bridge a pair of stationary contacts 21 which are supported by the insulating cover 22 of the cavity or relay chamber 19b. Core 2 of cable 1 is virtually the only source of heat to the thermal effects of which clamp structure 19, thermal relay 5 and its bimetallic element 6c are subjected. Thermal relay 5 operates in response to a fixed temperature slightly less than the temperature assumed by core 2 when the minimum current causing smoking of covering 3 is being carried by conductor 1 for an extended period of time. The arrangement shown in Figs. 6 and 7 may be provided with additional means for electrically and thermally insulating clamp structure 19 and relay 5 and for preventing access of moisture to them.

Figure 8:
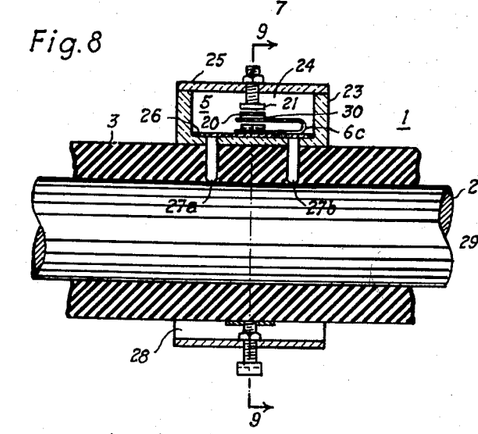
Fig. 8 is a substantially longitudinal section of another structure embodying the present invention.
Figure 9:
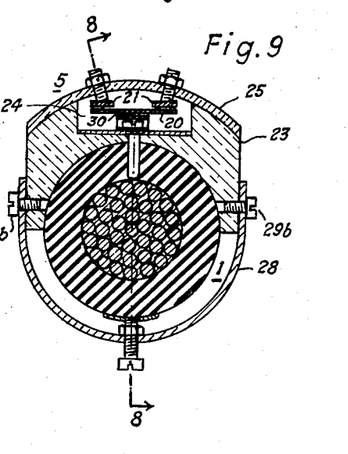
Fig. 9 is a section along 9—9 of Fig. 8.

Referring now to Figs. 8 and 9, the structure shown therein comprises a cable 1 having a core 2 and an insulating covering 3 made of an organic insulating material. Cable 1 supports a saddle structure 23 of insulating material which defines a relay-accommodating chamber 24 closed by an insulating cover 25. Saddle structure 23 is supported by a metal strap 28 by which it is strapped to the covering 3 of cable 1. Strap 28 is fastened at 29b to saddle structure 23. The set screws 29 serve the purpose of securely fastening saddle structure 23 to the covering 2 of cable 1. Metal plate 26 secured to the bottom of the relay-accommodating chamber 24 is provided with a pair of prongs 27a, 27b which pierce the insulating covering 3 of cable 1 and engage the core 2 of the cable with their ends remote from plate 26. Prongs 27a, 27b are good conductors of heat and preferably made of brass, or another metal having like properties. Prongs 27a, 27b carry heat away from the core of cable 1 to the plate 26 in relay chamber 24. Plate 26 supports a U-shaped bimetallic strip 6c forming a part of relay 5 and adapted to bridge a pair of fixed contacts 21, 21 which are supported in spaced relation by insulating cover 25. To this end bimetallic strip 6c supports a contact bridge 20 by means of an insulating strip 30.

The arrangement shown in Figs. 8 and 9 does not call for additional means for electrically and thermally insulating any part thereof since plate 26 and thermal relay 5 accommodated in chamber 24 are sufficiently insulated by the saddle-shaped insulating body 23 and its cover 25.

Figure 10:
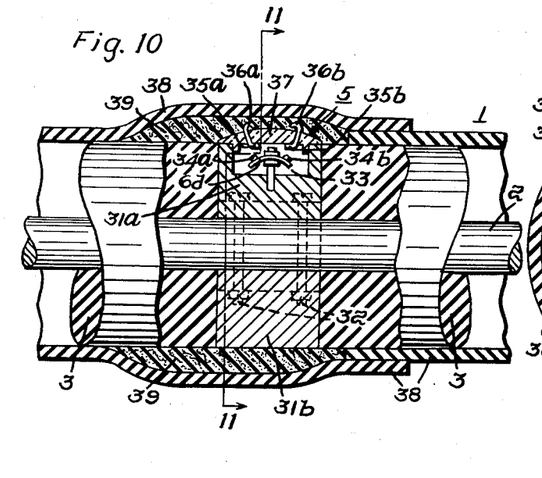
Fig. 10 is a substantially longitudinal section of an embodiment of the invention suitable to be installed in moist locations.
Figure 11:
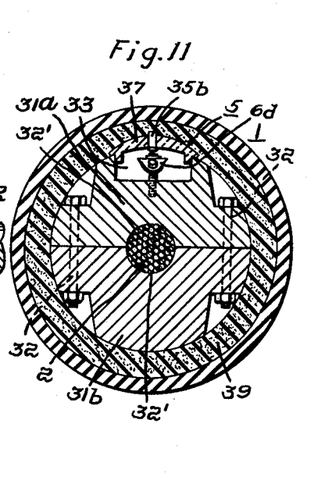
Fig. 11 is a section along 11—11 of Fig. 10.

The structure shown in Figs. 10 and 11 comprises a cable 1 having a metallic core 2 and an organic covering 3 enveloping core 2. Covering 3 is removed from cable 1 along a relatively short length thereof, thus producing a short length of bare core. Core 2 of cable 1 supports a clamp structure 31a, 31b having a cylindrical clamping surface 32' in physical contact with core 2 at the point of cable 1 where the covering 3 is removed from it. Clamp structure 31a, 31b consists of a metal having a high thermal conductivity, e. g. copper, and is made up of an upper part 31a and of a lower part 31b which are firmly pressed against the core 2 of cable 1 by means of screw threaded bolts and nuts 32. The upper part 31a of clamp structure 31a, 31b defines a chamber 33 adapted to accommodate a thermal relay or switching device 5. Switching device 5 includes a bimetallic disc 6d supporting a pair of movable contacts 34a 34b adapted to cooperate with a pair of fixed contacts 35a, 35b supported by a pair of terminal elements 36a, 36b. The latter are in turn supported by the insulating cover 37 of relay chamber 33. There is physical engagement between the upper part 31a of the clamp structure 31a, 31b and the bimetallic disc 6d as long as the latter is relatively cool. The bimetallic disc 6d operates at a fixed temperature, less than the temperature assumed by the core 2 of the cable 1 when the minimum current causing smoking of the covering 3 is being carried by the cable for a long period of time. When the bimetallic disc 6c snaps away from the upper part 31a of the clamping structure 31a, 31b the contacts 34a, 34b thereof engage the fixed contacts 35a and 35b and thereby close a signalling circuit or a tripping circuit of a circuit interrupter.

Figure 16:
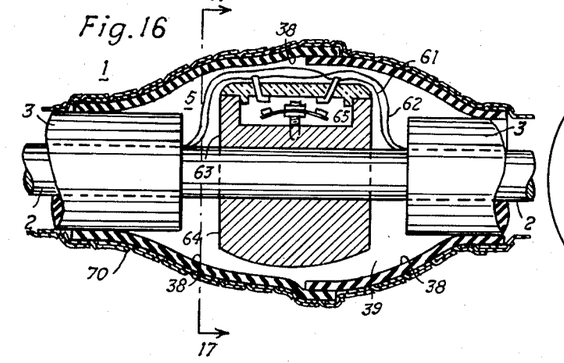
Fig. 16 is substantially a longitudinal section of an embodiment of the invention including a cable having pilot wires forming an integral part thereof.

The fact that the thermal relay 5 is arranged at a point of the clamp structure 31a, 31b remote from the clamping surface 32' thereof and remote from the core 2 of cable 3, results in a time lag between the peak temperatures reached by the core 2 of cable 1 and of the peak temperatures reached by the bimetallic disc 6d. This time lag enables to assimilate the operating characteristics of the thermal relay 5 and the smoke evolution characteristics of the cable shown in Figs. 1 and 2. Core 2 of cable 1 is virtually the only source of heat to the thermal effects of which the clamp structure 31a, 31b and the thermal relay 5 are subjected. The clamp structure 31a, 31b and the thermal relay 5 are accommodated in a substantially tubular enclosure 38 of a sheet-rubber-like material. The axially outer ends of enclosure 38 lap the covering 3 of the cable 1. Windings of tape as best shown in Fig. 16 may be provided to establish a watertight joint between the covering 3 of the cable 1 and the axially outer ends of the enclosure 38.

It is generally desirable to provide insulation of substantially the same dielectric strength for the structure conducting heat away from the core of the cable to the thermal relay, and for the thermal relay, as for the core of the cable itself. There are some exceptions where the heat conducting structure and the thermal relay require less insulation as, for instance, where the device is kept in a room in which the atmosphere is reasonably dry at any time. In the structure shown in Figs. 10 and 11 a space 39 is left between the enclosure 38, on the one hand, and the covering 3 and the heat dissipating structure 31a, 31b, on the other hand. Space 39 is filled with a suitable filler for increasing the dielectric strength of the insulation of the structure 31a, 31b.

If desired the enclosure 38 may be omitted and the point of the cable where some of the covering 3 is removed and the structure 31a, 31b, or an equivalent structure, and the thermal relay 5 inserted, packed in a suitable plastic substance having properties similar to rubber, i. e. an elastomeric body may be provided to enclose and seal-off the entire protective device.

Figure 12:
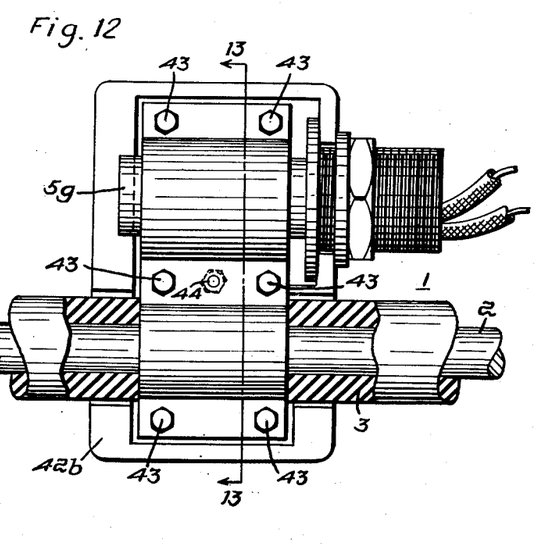
Fig. 12 is an embodiment of the invention involving a thermostat which is accommodated in a tubular housing.
Figure 13:
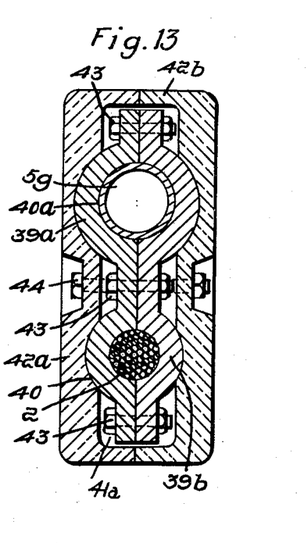
Fig. 13 is a section along 13—13 of Fig. 12.

The arrangement shown in Figs. 12 and 13 includes a thermostat which is accommodated in a tubular housing 5g. Such thermostats are widely used to control auxiliary circuits in accordance with variations in temperature to which the thermostat is subjected. The insulating covering 3 is removed from the core 2 of the cable 1 along a relatively short length thereof. The clamp 39a, 39b has a first cylindrical clamping surface 40 engaging core 2 of cable 1 and a second cylindrical clamping surface 40a engaging the cylindrical housing 5g of the thermostat. Clamp 39a, 39b is inserted into the recesses 41a, 41b provided in a housing 42a, 42b for accommodating clamp 39a and 39b. Clamp 39a, 39b is held together by a number of screw threaded studs and screw nuts 43. Similarly, the two parts 42a and 42b of housing 42a, 42b are held in position by means of a screw threaded stud and a nut 44. Housing 42a, 42b may be provided with any suitable kind of external insulation (not shown) as, for instance, layers of insulating tape wound around it or a coat of an elastomer. Preferably an elastomer of the type which polymerizes at room temperature and can be applied in the field to the external surfaces of housing 42a, 42b is used for coating said housing.

Figure 14:
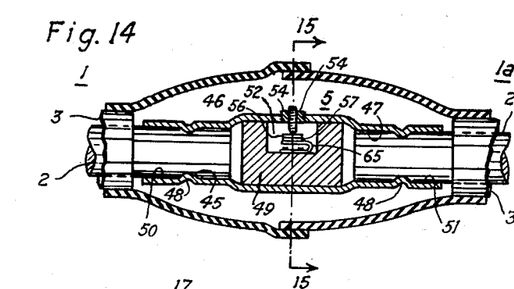
Fig. 14 is substantially a longitudinal section of a connector embodying the invention.
Figure 15:
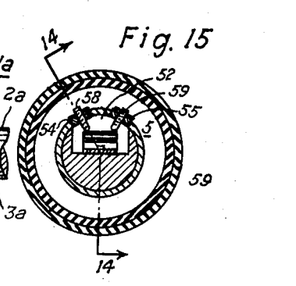
Fig. 15 is a section along 15—15 of Fig. 14.

The cables 1 and 1a shown in Figs. 14 and 15 include a core 2 and 2a and a covering 3 and 3a of an organic insulating material as, for instance, compounded rubber, deproteinized rubber, polyethylene, etc. The term organic insulating material, wherever used in this context, is intended to cover mixtures or aggregates of inorganic and organic insulating materials subject, on account of their content or component of organic insulating material, to thermal destruction in case of overheating. As an example for such a composite covering a covering made of fiber glass and a silicone rubber compound may be mentioned. The term organic covering as used in this context is also intended to include jackets or sheaths for cables made of organic insulating materials primarily provided to increase the mechanical properties of the cable, including its abrasion resistance, rather than to provide dielectric strength. The coverings 3 and 3a of aligned cables 1 and 1a have been stripped from the cores 2 and 2a at the immediately adjacent ends of cables 1 and 1a. A clamp-on connector 45 is in conductive engagement with the stripped ends 46, 47 of each of said pair of cables 1, 1a to establish a current-carrying connection between said pair of conductors or cables 1 and 1a. The connector 45 is firmly connected to the cores 2 and 2a of cables 1 and 1a by means of circular indentations 48 which form recesses in the cores 2, 2a of cables 1, 1a. If it is desired to increase the heat absorbing capacity of connector 45 a cylindrical block 49 of copper or the like heat absorbing material may be inserted into connector 45. Block 49 is provided with a recess 52 defining a chamber for receiving a thermal relay or bimetallic switching device 5. The bimetallic switching device 5 is arranged in close heat exchanging relation to connector 45 and lag block 49, respectively, at a point of the connector remote from the clamping surfaces 50, 51 thereof. The conductors 1, 1a and their cores 2, 2a are the only sources of heat to the action of which connector 45 and switching device 5 are exposed when conductors 1 and 1a are carrying current. Switching device 5 includes a U-shaped bimetallic strip 6h supported by lag block 49 and accommodated in the recess 52 thereof. One end of bimetallic strip 6h is screwed to the lag block 49 and the other end thereof carries a bridging element 56 which is electrically insulated from the bimetallic strip 6h by means of an insulating strip 57. Bridging element 56 is adapted to bridge a pair of contacts 58 and 59 of which each is supported by an insulating bushing 54, 55. Insulating bushings 54, 55 are in turn supported by the body of the connector 45. The bimetallic switching device 5 is set to operate, i. e. to close or bridge contacts 58, 59 in response to a temperature which either of said pair of conductors 1, 1a assumes when subjected to a current in order of the minimum load which, if permanently maintained, causes initiation of smoking of said organic coverings 3, 3a of either of said pair of conductors 1, 1a. In other words, switching device 5 operates when the bimetallic strip 6h thereof reaches the minimum smoking temperature of either of both cables 1 and 1a.

Figure 17:
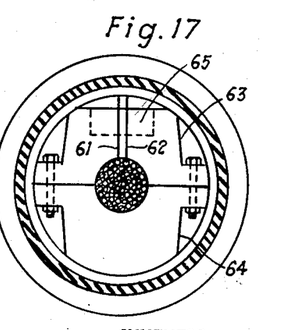
Fig. 17 is a section along 17—17 of Fig. 16.

The structure shown in Figs. 16 and 17 includes a cable 1 comprising a metallic current carrying core 2 and an organic covering 3 enveloping core 2. In addition thereto covering 3 envelops a pair of control wires or pilot wires 61, 62 which are arranged on the outer surface of the core 2 but electrically insulated from the conductors by which core 2 is constituted. Covering 2 is removed from conductor 1 along a relatively short length thereof. A metallic clamp structure 63, 64 is clamped to the core 2 of conductor 1 at the point thereof where the covering is removed from it. Clamp structure 63, 64 defines a relay chamber 65 and supports an auxiliary switching device or tripping relay 5 which is arranged in said chamber. The point of support of tripping relay 5 is spaced from core 2 which results in a temperature gradient between core 2 and relay 5 unless a condition of thermal equilibrium is established between these two points. Relay 5 may include any suitable bimetallic element. If relay 5 is used to trip a circuit interrupter of the type having a pair of separable contacts, i. e. if relay 5 is used in an arrangement of the kind diagrammatically shown in Fig. 4, the ultimate trip of the circuit interrupter as determined by the fixed operating temperature of relay 5 should be slightly less than the minimum continuous current of conductor 1 causing smoking thereof. The clamp structure 63, 64 and the relay 5 have thermal parameters balanced to assimilate the tripping characteristic of relay 5 to the smoking point characteristic of covering 3. Core 2 of conductor 1 is virtually the only source of heat to the thermal effects of which clamp structure 63, 64 and relay 5 are subjected. A common substantially tublar enclosure 38 is provided for the clamp structure 63, 64 and the relay 5. This enclosure is preferably made of a sheet-rubber-like material and the axially outer ends thereof are in lapping engagement with the covering 3 of cable 1. The lapping ends of enclosure 38 are surrounded by one or more layers of insulating tape 70 to preclude moisture from entering into the enclosure 38. The space 39 between enclosure 38 and clamp structure 63, 64 may be filled by a suitable compound or filler as set forth in connection with the structure shown in Figs. 10 and 11.

It will be understood that I have illustrated and described herein preferred embodiments only of my invention and that various alterations may be made in the details thereof without departing from the spirit and scope of my invention as defined in the appended claims.

I claim:

1. An arrangement for the protection against overloading of electric conductors which are insulated by an organic insulating material comprising a conductor having a metallic core and an organic covering enveloping said core, said covering being removed from said conductor along a relatively short length thereof, a thermal relay having a heat responsive element arranged in spaced relation from said core, said thermal relay being responsive at a fixed temperature slightly in excess of the temperature assumed by said core when said conductor is continuously carrying the maximum continuous current thereof, a heat conducting and heat absorbing structure arranged at the point of said conductor where said covering is removed, said structure being in close heat exchanging relation to both said core and said heat responsive element of said thermal relay and having thermal parameters balanced to assimilate the response characteristic of said thermal relay to the smoking point characteristic of said covering, and said core being virtually the only source of heat to the thermal effects of which said thermal relay and said structure are subjected.

2. An arrangement for the protection against overloading of electric conductors which are insulated by an organic insulating material comprising a conductor having a metallic overloading core and an organic covering enveloping said core, said covering being removed from said conductor along a relatively short length thereof, an automatic circuit interrupter having a pair of separable contacts for controlling the flow of current through said conductor, said circuit interrupter being controlled by a thermal tripping relay arrange remotely therefrom at the point of said conductor where said covering is removed, the ultimate trip of said circuit interrupter as determined by the fixed response temperature of said thermal relay being slightly less than the minimum continuous current of said conductor causing smoking of said covering thereof, a heat conducting and heat absorbing structure arranged at the point of said conductor where said covering is removed and in close heat exchanging relation to both said core and said heat responsive element of said thermal relay, said structure having balanced thermal parameters to assimilate the response characteristic of said thermal relay to the smoking point characteristic of said covering of said conductor and said core of said conductor being virtually the only source of heat to the thermal effects of which said structure and said thermal relay are subjected.

3. An arrangement for the protection against overloading of electric conductors which are insulated by an organic insulating material comprising a conductor having a metallic core and an organic covering enveloping said core, a clamp structure supported by and clamped on said conductor, said clamp structure including a metallic portion in physical contact with said core of said conductor, a thermal relay supported by said clamp structure in close heat exchanging relation to said metallic portion thereof, said thermal relay being arranged in spaced relation from said core and operative in response to a fixed temperature slightly less than the temperature assumed by said core when the minimum current causing smoking of said covering is being carried by said conductor for an extended period of time, and said core being virtually the only source of heat to the thermal effects of which said metallic portion of said clamp structure and said thermal relay are subjected.

4. An arrangement for the protection against overloading of electric conductors which are insulated by an organic insulating material comprising a conductor having a metallic core and an organic covering enveloping said core, said covering being removed from said conductor along a relatively short length thereof to expose said core, a substantially metallic structure arranged at the point of said conductor where said covering is removed in close heat exchanging relation to said core, said structure having a cavity defining a relay-receiving chamber, a thermal relay arranged within said cavity in spaced relation from said core, said relay being operative in response to a fixed temperature slightly less than the temperature assumed by said core when the minimum current causing smoking of said covering is being continuously carried by said conductor, and said core being virtually the only source of heat to the thermal effects of which said structure and said relay are subjected.

5. An arrangement for the protection against overloading of electrical conductors which are insulated by an organic insulating material comprising a conductor having a metallic core and an organic covering enveloping said core, said covering being removed from said conductor along a relatively short length thereof, a clamp structure having a clamping surface in physical contact with said core at the point of said conductor where said covering is removed, a thermal relay operative in response to a fixed temperature slightly less than the temperature assumed by said core when the minimum current causing smoking of said covering is being continuously carried by said conductor, said thermal relay being supported by said clamp structure at a point thereof spaced from said core, a common substantially tubular enclosure of sheet-rubber-like material for said clamp structure and said thermal relay, the axially outer ends of said enclosure lapping said covering of said conductor, and said core being virtually the only source of heat to the thermal effects of which said clamp structure and said thermal relay are subjected.

6. An arrangement for the protection against overloading of electric conductors which are insulated by an organic insulating material comprising a conductor having a metallic core and an organic covering enveloping said core, said covering being removed from said conductor along a relatively short length thereof, an automatic current interrupter having a pair of separable contacts for controlling the flow of current through said conductor, said circuit interrupter being controlled by a thermal tipping relay having a fixed operating temperature and being arranged remotely from said circuit interrupter at the point of said conductor where said covering is removed, the ultimate trip of said interrupter as determined by the fixed operating temperature of said tripping relay being slightly less than the minimum continuous current of said conductor causing smoking thereof, a metallic clamp structure supported by and clamped on said conductor, said clamp structure having a clamping surface in physical contact with said core of said conductor at the point thereof where said covering is removed, said clamp structure supporting said tripping relay at a point thereof spaced from said core, said clamp structure and said tripping relay having thermal parameters balanced to assimilate the tripping characteristic of said tripping relay to the smoking point characteristic of said covering, a common substantially tubular enclosure of sheet-rubber-like material for said clamp structure and said tripping relay, the axially outer ends of said enclosure lapping said covering of said conductor, and said core being virtually the only source of heat to the thermal effects of which said clamp structure and said tripping relay are subjected.

7. An arrangement for the protection against overloading of electric conductors which are insulated by an organic insulating material comprising a conductor having a current carrying core and an organic insulating covering enveloping said core, said conductor having a section of relatively short length where said covering is removed from said core to expose said core, a structure having a substantial heat absorbing capacity arranged in close heat exchanging relation to said exposed section of said core, a thermally responsive switching device in close heat exchanging relation to a surface of said structure spaced from said exposed section of said core to cause the temperature of said switching device to lag behind the temperature of said core upon any increase of the current carried by said conductor, said switching device being operative in response to a fixed temperature slightly less than the minimum temperature which if maintained permanently would cause evolution of smoke from the insulation of which said covering is made, and said core being virtually the only source of heat to the thermal effects of which said structure and said switching device are subjected.

8. An arrangement for the protection against overloading of electric conductors which are insulated by an organic insulating material comprising a conductor having a current carrying core and an organic insulating covering enveloping said core, said covering having a recess equal in depth to the depth of said covering, a structure made of a good thermal conductor and having a subtantial heat absorbing capacity arranged within said recess in close heat exchanging relation to said core, a thermally responsive switching device including a bimetallic element and a pair of contacts relatively movable under the action of said bimetallic element, said switching device being in close heat exchanging relation to a surface of said structure spaced from said core, said core being the only source of heat to the action of which said structure and said switching device are exposed when said conductor is carrying current and said switching device being operative in response to a fixed temperature slightly less than the minimum temperature which if maintained continuously would cause evolution of smoke from the insulation of which said covering is made, and the thermal characteristics of both said structure and of said switching device being balanced to match the response characteristic of said switching device with the smoking point characteristic of said conductor throughout substantially the entire load range and overload range thereof.

9. An arrangement for the protection against overloading of electric conductors which are insulated by an organic insulating material comprising a conductor having a current carrying core and an organic insulating covering enveloping said core, said conductor having a section of relatively short length stripped from said covering and located between a pair of spaced relatively long sections of said covering, a metallic structure arranged in close heat exchanging relation to said stripped section of said core, the heat absorbing capacity of said metallic structure exceeding the heat absorbing capacity of an equal length of said core, a bimetallic switching device arranged in close heat exchanging relation to said metallic structure at a point thereof remote from said stripped section of said core to cause the temperature of said switching device to lag behind the temperature of said core upon any increase of the current carried by said core, said core being substantially the only source of heat to the action of which said structure and said switching device are exposed when said conductor is carrying current, and said switching device being operative in response to a fixed temperature slightly less than the minimum temperature which if permanently maintained would cause evolution of smoke from the insulating material of which said covering is made.

10. An arrangement for the protection against overloading of electric conductors which are insulated by an organic insulating material comprising a conductor having a current carrying core and an organic insulating covering enveloping said core, said covering having a gap of relatively short length exposing said core, a structure having a high thermal conductivity arranged in close heat exchanging relation to said core at the gap of said covering, a thermally responsive switching device including a pair of relatively movable contacts arranged in close heat exchanging relation to said structure at a point thereof remote from said core to cause the temperature of said switching device to lag behind the temperature of said core upon any increase of the current carried by said core, said switching device being operative in response to a fixed temperature less than the minimum temperature which if maintained permanently would cause evolution of smoke from the insulating material of which said covering consists, and means for thermally insulating said structure and said switching device from any source of heat other than said core.

11. An arrangement for the protection against overloading of electric conductors which are insulated by an organic insulating material comprising a conductor having a current carrying core and an organic insulating covering enveloping said core, said covering being removed from said core along a relatively short length thereof to form a toroidal gap between two relatively long spaced sections of said covering, a metallic clamp-on structure arranged within said gap and clamped to said core, a bimetallic switching device arranged in close heat exchanging relation to said clamp-on structure at a point remote from the clamping surface thereof, said core being substantially the only source of heat to the action of which said clamp-on structure and said switching device are exposed when said conductor is carrying current, and said switching device being operative in response to a fixed temperature in the order of but slightly less than the minimum temperature which if maintained permanently would cause evolution of smoke from the insulation of which said covering is made.

12. An arrangement for the protection against overloading of electric conductors which are insulated by an organic insulating material comprising a pair of aligned conductors each having a current carrying core and an organic insulating covering enveloping said core, each of said pair of conductors having an end stripped of said organic covering, a clamp-on connector in conductive engagement with said stripped end of each of said pair of conductors to establish a current carrying connection between said pair of conductors, a bimetallic switching device arranged in close heat exchanging relation to said connector at a point remote from the clamping surfaces thereof, said pair of conductors being substantially the only source of heat to the action of which said connector and said switching device are exposed when said pair of conductors is carrying current, and said switching device being operative in response to a fixed temperature in the order of the temperature which either of said pair of conductors assumes when subjected to a current in the order of the minimum load which if permanently maintained causes initiation of smoking of said organic covering of either of said pair of conductors.

13. An arrangement for the protection against overloading of electric conductors which are insulated by an organic insulating material comprising a conductor having a current carrying core and an organic insulating covering enveloping said core, said conductor having a section of limited length stripped of said covering to expose said core thereof, a thermally conductive structure having a substantial heat absorbing capacity in close heat exchanging relation to said core at said stripped section of said conductor, a thermally responsive switching device in close heat exchanging relation to a surface of said structure spaced from said core to cause the temperature of said switching device to lag behind the temperature of said core upon any increase of the current carried by said conductor, said switching device being operative in response to a fixed temperature slightly less than the minimum temperature which causes evolution of smoke from said cover if maintained permanently, and common means for housing said core at said stripped section of said conductor, said thermally conductive structure and said switching device, said housing means including a rubber bag lapping said covering of said conductor and a pair of windings of insulating tape each extending over the lapping portion of said rubber bag to provide a watertight joint.

14. An arrangement for the protection against overloading of electric cables which are insulated by an organic insulating material comprising a cable having a current carrying core and an organic insulating covering enveloping said core, said covering being provided with a recess equal in depth to the depth of said covering, a structure made of a good thermal conductor arranged within said recess in close heat exchanging relation to said core, a thermally responsive auxiliary switching device including a bimetallic element and a pair of contacts relatively movable under the action of said bimetallic element, said switching device being arranged in close heat exchanging relation to a surface of said structure spaced from said core and operative in response to a fixed temperature slightly less than the minimum temperature which if maintained permanently would result in evolution of smoke from said covering, said core being virtually the only source of heat to the action of which said structure and said switching device are exposed when said cable is carrying current, and the thermal parameters of said structure and the thermal parameters of said switching device being determined to match the response characteristic of said switching device and the smoking point characteristic of said cable throughout substantially the entire load range and overload range of said cable.

15. An arrangement for the protection against overloading of electric conductors which are insulated by an organic insulating material comprising a conductor having a metallic core and an organic covering enveloping said core, a thermal relay having a heat responsive element arranged in spaced relation from said core, said relay being responsive at a fixed temperature slightly in excess of the temperature assumed by said core when said conductor is continuously carrying the maximum continuous current thereof, a heat conducting and heat absorbing structure projecting transversely across said covering and in close heat exchanging relation to both said core and said heat responsive element of said relay, said structure having a heat absorbing capacity in excess of 100 percent of an equal length of said metallic core to closely match the response characteristic of said relay and the smoking point characteristic of said covering, and said core being virtually the only source of heat to the thermal effects of which said relay and said structure are subjected.

16. An arrangement for the protection against overloading of electric conductors which are insulated by an organic insulating material comprising a conductor having a metallic core and an organic covering enveloping said core, a thermal relay having a heat responsive element arranged in spaced relation from said core, said relay being responsive to a fixed temperature slightly in excess of the temperature assumed by said core when said conductor is continuously carrying the maximum continuous current thereof, a heat conducting and heat absorbing structure in close heat exchanging relation to said heat responsive element of said relay, said covering exposing said core sufficiently along a relatively short length to enable direct physical engagement of said core by a portion of said heat conducting and heat absorbing structure, and said heat conducting and heat absorbing structure being in physical engagement with said exposed length of said core, said heat conducting and heat absorbing structure having thermal parameters balanced to assimilate the response characteristic of said relay to the smoking point characteristic of said covering, and said core being virtually the only source of heat to the effects of which said relay and said heat conducting and heat absorbing structure are subjected.

References Cited in the file of this patent

UNITED STATES PATENTS

| | | |
|---|---|---|
| 2,018,512 | De Laney et al. | Oct. 22, 1935 |
| 2,269,863 | Shaw | Jan. 13, 1942 |
| 2,273,381 | Shaw | Feb. 17, 1942 |
| 2,313,975 | Spear et al. | Mar. 16, 1943 |
| 2,349,673 | Pearson et al. | May 23, 1944 |
| 2,358,215 | Darling | Sept. 12, 1944 |
| 2,455,011 | Ingels | Nov. 30, 1948 |
| 2,502,727 | Ingels | Apr. 4, 1950 |

FOREIGN PATENTS

| | | |
|---|---|---|
| 828,882 | Germany | Jan. 21, 1952 |